United States Patent
Burns et al.

(10) Patent No.: US 8,663,873 B2
(45) Date of Patent: Mar. 4, 2014

(54) HOLOGRAPHIC RECORDING MEDIUM AND METHOD OF RECORDING A HOLOGRAM

(75) Inventors: Andrew Arthur Paul Burns, Nisakayuna, NY (US); Arunkumar Natarajan, Niskayuna, NY (US); Shantaram Narayan Naik, Bangalore (IN); Eugene Boden, Scotia, NY (US); Kiran Arunkumar Puthamane, South Kodagu (IN); Vinodkumar Vasudevan, Mavelikara (IN); Sumeet Jain, Schenectady, NY (US)

(73) Assignee: SABIC Innovative Plastics IP B.V. (NL)

( * ) Notice: Subject to any disclaimer, the term of this patent is extended or adjusted under 35 U.S.C. 154(b) by 74 days.

(21) Appl. No.: 13/350,149

(22) Filed: Jan. 13, 2012

(65) Prior Publication Data

US 2013/0183608 A1    Jul. 18, 2013

(51) Int. Cl.
*G03H 1/02*    (2006.01)

(52) U.S. Cl.
USPC ........................................ 430/2; 430/1; 359/3

(58) Field of Classification Search
None
See application file for complete search history.

(56) References Cited

U.S. PATENT DOCUMENTS

| | | | |
|---|---|---|---|
| 4,304,809 A | 12/1981 | Moraw et al. | |
| 4,477,521 A | 10/1984 | Lehmann et al. | |
| 4,547,002 A | 10/1985 | Colgate, Jr. | |
| 4,877,717 A | 10/1989 | Suzuki et al. | |
| 5,061,582 A * | 10/1991 | Brettle et al. | 430/19 |
| 5,192,644 A | 3/1993 | Ohta et al. | |
| 5,492,370 A | 2/1996 | Chatwin et al. | |
| 5,716,695 A | 2/1998 | Benoit et al. | |
| 6,063,539 A * | 5/2000 | Obayashi et al. | 430/138 |
| 6,103,161 A | 8/2000 | Lopez | |
| 6,294,267 B1 | 9/2001 | Benoit | |
| 7,034,970 B2 * | 4/2006 | Matsui et al. | 359/3 |
| 7,102,802 B1 | 9/2006 | Erben et al. | |
| 7,524,589 B2 | 4/2009 | Furuki et al. | |
| 7,745,065 B2 | 6/2010 | Eto et al. | |
| 2001/0015897 A1 | 8/2001 | Aida et al. | |

(Continued)

FOREIGN PATENT DOCUMENTS

| | | | |
|---|---|---|---|
| CA | 2635037 A1 | | 10/2008 |
| DE | 2910668 | * | 9/1980 |

(Continued)

OTHER PUBLICATIONS

Nishio et al. "New and stable endoperoxide from pteridin-2,4,7,trione and singlet oxygen", Tetrahedron Lett., vol. 27(46) pp. 5637-5640 (1986).*

(Continued)

*Primary Examiner* — Martin Angebranndt
(74) *Attorney, Agent, or Firm* — Cantor Colburn LLP

(57) ABSTRACT

Articles for recording a hologram are described. The articles include a holographic recording medium having a transparent polymeric binder and a photoreactive dye dispersed therein. The articles also include a first compound, dispersed in the holographic recording medium or disposed over a first surface of the holographic recording medium from which surface the hologram is viewed, that is transparent to light in the wavelength range to which the photoreactive dye is sensitive and which is capable of being converted to a converted compound that is opaque to light in the wavelength range to which the photoreactive dye is sensitive and transparent to light in a different wavelength range for viewing the hologram.

40 Claims, 8 Drawing Sheets

(56) References Cited

U.S. PATENT DOCUMENTS

| | | |
|---|---|---|
| 2002/0018430 A1 | 2/2002 | Heckenkamp et al. |
| 2004/0033423 A1 | 2/2004 | Burzynski et al. |
| 2004/0045204 A1 | 3/2004 | Miano et al. |
| 2004/0152013 A1* | 8/2004 | Olson et al. ............ 430/270.11 |
| 2004/0175656 A1 | 9/2004 | Baer et al. |
| 2004/0190093 A1 | 9/2004 | Matsui et al. |
| 2004/0214106 A1 | 10/2004 | Berneth et al. |
| 2004/0264358 A1 | 12/2004 | El Hafidi et al. |
| 2005/0208256 A1 | 9/2005 | Yoshizawa et al. |
| 2005/0208388 A1* | 9/2005 | Furuki et al. ...................... 430/1 |
| 2006/0073392 A1 | 4/2006 | Erben et al. |
| 2006/0109531 A1 | 5/2006 | Watanabe et al. |
| 2006/0221422 A1 | 10/2006 | Mizushima et al. |
| 2006/0269878 A1* | 11/2006 | Chopra et al. ................ 430/333 |
| 2007/0018001 A1 | 1/2007 | Yesildag et al. |
| 2007/0115790 A1 | 5/2007 | Kawano et al. |
| 2007/0147214 A1* | 6/2007 | Erben et al. .................... 369/103 |
| 2007/0178295 A1 | 8/2007 | Haas et al. |
| 2007/0206249 A1 | 9/2007 | Phillips et al. |
| 2008/0213625 A1* | 9/2008 | Raymo et al. ................. 428/704 |
| 2009/0202919 A1* | 8/2009 | Waldman et al. ................ 430/2 |
| 2010/0328741 A1* | 12/2010 | Cheverton et al. ............... 359/2 |
| 2012/0178019 A1* | 7/2012 | Jain et al. ......................... 430/2 |

FOREIGN PATENT DOCUMENTS

| | | | |
|---|---|---|---|
| JP | 04-128834 | * | 4/1992 |
| JP | 6220048 A | | 9/1994 |
| JP | 7077774 A | | 3/1995 |
| JP | 07-326076 | * | 12/1995 |
| JP | 11-039725 | * | 2/1999 |
| JP | 2003-302717 | * | 10/2003 |
| JP | 2004-354712 | * | 12/2004 |
| JP | 2005195952 | | 7/2005 |
| JP | 2008281661 | | 11/2008 |
| WO | WO2007050354 A2 | | 5/2007 |
| WO | WO2009054981 A1 | | 4/2009 |

OTHER PUBLICATIONS

Sumio Tokita et al, "Benzo [1,23-kl:4,5,6-k'1']Dixanthene no Hitaishogata Ruijitai Oyobi Sono no Gosei to Sorera no Tokusei", J Chem. Soc. Japan, vol. 10 pp. 1097-1101 (1992).*

Xue et al., Holographic and spectroscopic characterization of spiropyran doped poly(methyl methacrylate) films., Thin. Sol. Films, vol. 253 pp. 228-232 (1994).*

U.S. Appl. No. 12/985,474, filed Jan. 6, 2011 entitled "Method of Making Holographic Recording Materials and Articles Formed Thereby".

Hanneberg et al. "2D and 3D buried gratings form azobenzene-polymer multilayer films" Proc. SPIE, vol. 6343 pp. 634337-1 to 634337-9 (2006).

Morales et al. "Synthesis of a photoresponsive polymer and its incorporation into an organic superlattice", Sandia Report SAND2005-0144, 24 pages (Jan. 2005).

Blanche, et al, 2000, Polarization holography reveals the nature of the grating in polymers containing azo-dye, Opt. Commun. vol. 185, pp. 1-12.

Popov, et al., Apodization of volume holograms by diffusion of organic molecules in a polymer, Sep. 1991, Opt. Spectrosc. vol. 71(3), pp. 295-296.

Popov, et al., 1994, Photochemical and diffusional apodization of high-efficiency thick phase holograms, Proc. SPIE vol. 2216, pp. 64-71.

International Search Report Including Transmittal for International Application No. PCT/US2012/020393 filed Jan. 6, 2012, mailed Apr. 19, 2012, 4 pages.

Written Opinion of the International Searching Authority for International Application No. PCT/US2012/020393 filed Jan. 6, 2012, mailed Apr. 19, 2012, 4 pages.

International Search Report for International Application No. PCT/US2012/067156 mailed Feb. 7, 2013, 4 pages.

Written Opinion for International Application No. PCT/US2012/067156 mailed Feb. 7, 2013, 5 pages.

Tangirala et al., "Photopatternable reflective films produced by Nanolayer extrusion", Adv. Func. Mater., vol. 14(6) pp. 595-604 (Jun. 2002).

* cited by examiner

HOLOGRAPHIC RECORDING MEDIUM AND METHOD OF RECORDING A HOLOGRAM

BACKGROUND

The present disclosure relates to molded articles that incorporate holograms, more particularly color transmission holograms. Methods of making and using the same are also disclosed.

Holograms are an increasingly popular mechanism for the authentication of genuine articles, whether it is for security purposes or for brand protection. The use of holograms for these purposes is driven primarily by the relative difficulty with which they can be duplicated. Holograms are created by interfering two or more coherent beams of light to create an interference pattern and storing that pattern in a holographic recording medium. Information or imagery can be stored in a hologram by imparting the data or image to one of the two coherent beams prior to their interference. The hologram can be read out by illuminating it with beams matching either of the two original beams used to create the hologram and any data or images stored in the hologram will be displayed. As a result of the complex methods required to record holograms, their use for authentication has been proposed or implemented on articles such as credit cards, software, passports, clothing, electronics and the like.

Two categories of holograms include surface relief structure holograms and volume holograms. Many of the holograms used in security or authentication applications are of the surface relief type, in which the pattern and any data or image contained therein is stored in the structure or deformations imparted to the surface of the recording medium. As a result, the first recorded hologram may be created by the interference of two coherent beams, but duplicates can be created by copying the surface structure using techniques such as embossing. The duplication of holograms is convenient for the mass production of articles such as credit cards or security labels, but it also has the disadvantage that it makes the unauthorized duplication and/or modification of these holograms for use in counterfeit parts possible from the originals using the same mechanism.

Unlike surface holograms, volume holograms are formed in the bulk of a recording medium. Volume holograms have the ability to be multiplexed, storing information at different depths and different angles within the bulk recording material and thus have the ability to store greater amounts of information. In addition, because the pattern which makes up the hologram is embedded, copying cannot be done using the same techniques as for surface relief holograms.

Many types of holographic recording media have been proposed, including silver halide emulsions, photoresists, photopolymers, and the like. Photoreactive dye-based holograms have also been proposed for volume holograms, and they provide advantages not achievable by other holographic recording media, such as processability by thermoplastic techniques (molding, extrusion, lamination, etc.), instant hologram viewability, and latent photosensitivity after the initial writing. However, when incorporated into structures for real-world use, such as for security applications, the latent photosensitivity can lead to degradation of the recorded hologram. While several photostabilization techniques have been proposed, there is still a need for stabilization routes that reduce post-exposure processing requirements such as lamination of further layers onto the holographic structure after exposure.

Thus, there remains a need for improved holographic materials for incorporation into structures such as security or authentication devices.

BRIEF DESCRIPTION

In an exemplary embodiment, an article for recording a hologram comprises:

a first compound, dispersed in the holographic recording medium or disposed over a first surface of the holographic recording medium from which surface the hologram is viewed, wherein the first compound is transparent to light in the wavelength range to which the photoreactive dye is sensitive and which is capable of being converted to a first converted compound that is opaque to light in the wavelength range to which the photoreactive dye is sensitive and transparent to light in a different wavelength range for viewing the hologram.

In another exemplary embodiment, a method for recording a hologram comprises:

exposing a holographic recording medium to mutually coherent interfering light beams to generate an interference fringe pattern, the holographic recording medium comprising a transparent polymeric binder and a photoreactive dye dispersed therein, the holographic recording medium being disposed in an article, the article further comprising a first compound dispersed in the holographic recording medium or disposed over a first surface of the holographic recording medium from which surface the hologram is viewed, wherein the first compound is transparent to light in the wavelength range to which the photoreactive dye is sensitive;

wherein the first compound is capable of being converted to a converted compound that is opaque to light in the wavelength range to which the photoreactive dye is sensitive and transparent to light in a different wavelength range for viewing the hologram.

BRIEF DESCRIPTION OF THE DRAWINGS

Referring now to the Figures, which represent exemplary embodiments and wherein like elements may be numbered alike.

DETAILED DESCRIPTION

Figure 1:
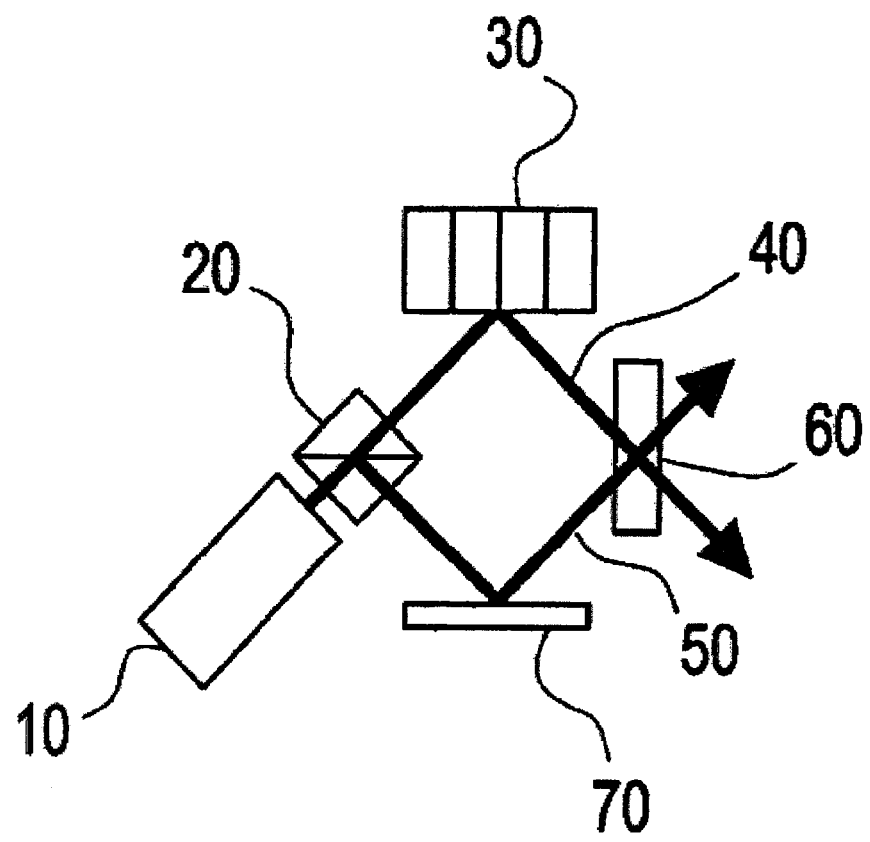
FIG. 1 represents a simplified diagram of an apparatus for recording a transmission hologram.

The photoreactive dye, which is reacted with light to form a hologram, may be conveniently referred to as a "holographic photoreactive dye". Referring to it as such can help avoid confusion with the compound that can be converted from transparent to a converted compound that is opaque in the wavelength range to which the holographic photoreactive dye is sensitive, as such a compound can also be a type of photoreactive dye when the conversion to the converted compound is in response to certain types of light exposure. The first compound may be referred to for convenience as a "latent light-blocking compound" and the converted compound may be referred to as a "light-blocking compound".

The holographic recording medium disclosed herein comprises a transparent polymeric binder with a holographic photoreactive dye dispersed therein. The polymeric binder may be a thermoplastic polymer, thermosetting polymer, or a combination comprising one or more of such polymers. The polymers can be oligomers, polymers, dendrimers, ionomers, copolymers such as for example, block copolymers, random copolymers, graft copolymers, star block copolymers; or the like, or a combination comprising at least one of the foregoing polymers. Exemplary thermoplastic organic polymers that can be used in the binder composition include, without limitation, polyacrylates, polymethacrylates, polyesters (e.g., cycloaliphatic polyesters, resorcinol arylate polyester, and so forth), polyolefins, polycarbonates, polystyrenes, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, or the like, or a combination comprising at least one of the foregoing thermoplastic polymers (either in admixture or co- or graft-polymerized), such as polycarbonate and polyester.

Exemplary polymeric binders are described herein as "transparent". Of course, this does not mean that the polymeric binder does not absorb any light of any wavelength. Exemplary polymeric binders need only be reasonably transparent in wavelengths for exposure and viewing of a hologram so as to not unduly interfere with the formation and viewing of the image. In an exemplary embodiment, the polymer binder has an absorbance in the relevant wavelength ranges of less than 0.2. In another exemplary embodiment, the polymer binder has an absorbance in the relevant wavelength ranges of less than 0.1. In yet another exemplary embodiment, the polymer binder has an absorbance in the relevant wavelength ranges of less than 0.01. Organic polymers that are not transparent to electromagnetic radiation can also be used in the binder composition if they can be modified to become transparent. For examples, polyolefins are not normally optically transparent because of the presence of large crystallites and/or spherulites. However, by copolymerizing polyolefins, they can be segregated into nanometer-sized domains that cause the copolymer to be optically transparent.

In one embodiment, the organic polymer and holographic photoreactive dye can be chemically attached. The holographic photoreactive dye can be attached to the backbone of the polymer. In another embodiment, the holographic photoreactive dye can be attached to the polymer backbone as a substituent. The chemical attachment can include covalent bonding, ionic bonding, or the like.

Examples of cycloaliphatic polyesters for use in the binder composition are those that are characterized by optical transparency, improved weatherability and low water absorption. It is also generally desirable that the cycloaliphatic polyesters have good melt compatibility with the polycarbonate resins since the polyesters can be mixed with the polycarbonate resins for use in the binder composition. Cycloaliphatic polyesters are generally prepared by reaction of a diol (e.g., straight chain or branched alkane diols, and those containing from 2 to 12 carbon atoms) with a dibasic acid or an acid derivative.

Polyarylates that can be used in the binder composition refer to polyesters of aromatic dicarboxylic acids and bisphenols. Polyarylate copolymers include carbonate linkages in addition to the aryl ester linkages, known as polyester-carbonates. These aryl esters may be used alone or in combination with each other or more particularly in combination with bisphenol polycarbonates. These organic polymers can be prepared, for example, in solution or by melt polymerization from aromatic dicarboxylic acids or their ester forming derivatives and bisphenols and their derivatives.

Blends of organic polymers may also be used as the binder composition for the holographic devices. Specifically, organic polymer blends can include polycarbonate (PC)-poly (1,4-cyclohexane-dimethanol-1,4-cyclohexanedicarboxylate) (PCCD), PC-poly(cyclohexanedimethanol-co-ethylene terephthalate) (PETG), PC-polyethylene terephthalate (PET), PC-polybutylene terephthalate (PBT), PC-polymethylmethacrylate (PMMA), PC-PCCD-PETG, resorcinol aryl polyester-PCCD, resorcinol aryl polyester-PETG, PC-resorcinol aryl polyester, resorcinol aryl polyester-polymethylmethacrylate (PMMA), resorcinol aryl polyester-PCCD-PETG, or the like, or a combination comprising at least one of the foregoing.

Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

Exemplary thermosetting polymers that may be used in the binder composition include, without limitation, polysiloxanes, phenolics, polyurethanes, epoxies, polyesters, polyamides, polyacrylates, polymethacrylates, or the like, or a combination comprising at least one of the foregoing thermosetting polymers. In one embodiment, the organic material can be a precursor to a thermosetting polymer.

As noted above, the photoactive material is a holographic photoreactive dye. The holographic photoreactive dye is one that is capable of being written and read by electromagnetic radiation. In one exemplary embodiment, the holographic photoreactive dyes can be written and read using actinic radiation i.e., from about 350 to about 1,100 nanometers. In a more specific embodiment, the wavelengths at which writing and reading are accomplished may be from about 400 nanometers to about 800 nanometers. In one exemplary embodiment, the reading and writing and is accomplished at a wavelength of about 400 to about 600 nanometers. In another exemplary embodiment, the writing and reading are accomplished at a wavelength of about 400 to about 550 nanometers. In one specific exemplary embodiment, a holographic medium is adapted for writing at a wavelength of about 405 nanometers. In such a specific exemplary embodiment, reading may be conducted at a wavelength of about 532 nanometers, although viewing of holograms may be conducted at other wavelengths depending on the viewing and illumination angles, and the diffraction grating spacing and angle. Examples of holographic photoreactive dyes include diarylethenes and nitrones.

An exemplary diarylethylene compound can be represented by formula (XI):

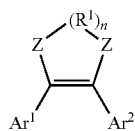
(XI)

wherein n is 0 or 1; $R^1$ is a single covalent bond ($C_0$), $C_1$-$C_3$ alkylene, $C_1$-$C_3$ perfluoroalkylene, oxygen; or —N(CH$_2$)$_x$CN wherein x is 1, 2, or 3; when n is 0, Z is $C_1$-$C_5$ alkyl, $C_1$-$C_5$ perfluoroalkyl, or CN; when n is 1, Z is CH$_2$, CF$_2$, or C=O; Ar$^1$ and Ar$^2$ are each independently i) phenyl, anthracene, phenanthrene, pyridine, pyridazine, 1H-phenalene or naphthyl, substituted with 1-3 substituents wherein the substituents are each independently $C_1$-$C_3$ alkyl, $C_1$-$C_3$ perfluoroalkyl, or fluorine; or ii) represented by following formulas:

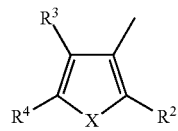
(XII)

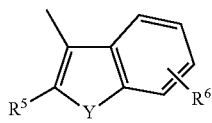
(XIII)

(XIV)

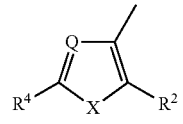
(XV)

wherein $R^2$ and $R^5$ are each independently $C_1$-$C_3$ alkyl or $C_1$-$C_3$ perfluoroalkyl; $R^3$ is $C_1$-$C_3$ alkyl, $C_1$-$C_3$ perfluoroalkyl, hydrogen, or fluorine; $R^4$ and $R^6$ are each independently $C_1$-$C_3$ alkyl, $C_1$-$C_3$ perfluoroalkyl, CN, hydrogen, fluorine, phenyl, pyridyl, isoxazole, —CHC(CN)$_2$, aldehyde, carboxylic acid, —($C_1$-$C_5$ alkyl)COOH or 2-methylenebenzo[d][1,3]dithiole; wherein X and Y are each independently oxygen, nitrogen, or sulfur, wherein the nitrogen is optionally substituted with $C_1$-$C_3$ alkyl or $C_1$-$C_3$ perfluoroalkyl; and wherein Q is nitrogen.

Examples of diarylethenes that can be used as photoactive materials include diarylperfluorocyclopentenes, diarylmaleic anhydrides, diarylmaleimides, or a combination comprising at least one of the foregoing diarylethenes. The diarylethenes are present as open-ring or closed-ring isomers. In general, the open ring isomers of diarylethenes have absorption bands at shorter wavelengths. Upon irradiation with ultraviolet light, new absorption bands appear at longer wavelengths, which are ascribed to the closed-ring isomers. In general, the absorption spectra of the closed-ring isomers depend on the substituents of the thiophene rings, naphthalene rings or the phenyl rings. The absorption structures of the open-ring isomers depend upon the upper cycloalkene structures. For example, the open-ring isomers of maleic anhydride or maleimide derivatives show spectral shifts to longer wavelengths in comparison with the perfluorocyclopentene derivatives.

Examples of diarylethene closed ring isomers include:

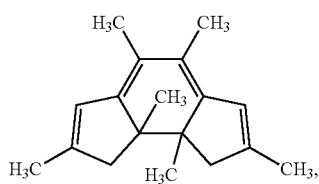
(XVI)

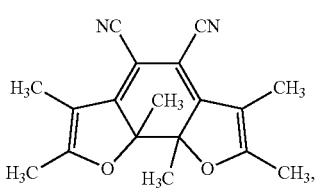
(XVII)

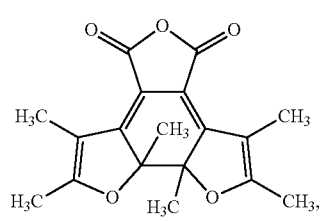
(XVIII)

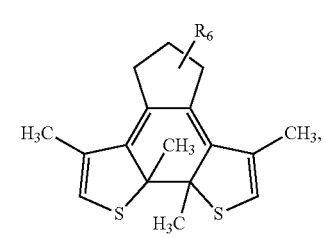
(XIX)

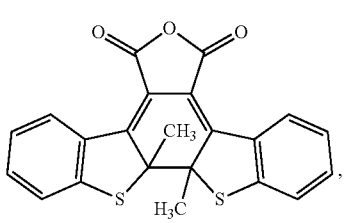
(XX)

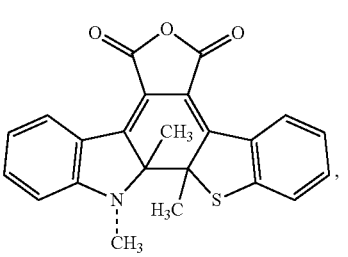
(XXI)

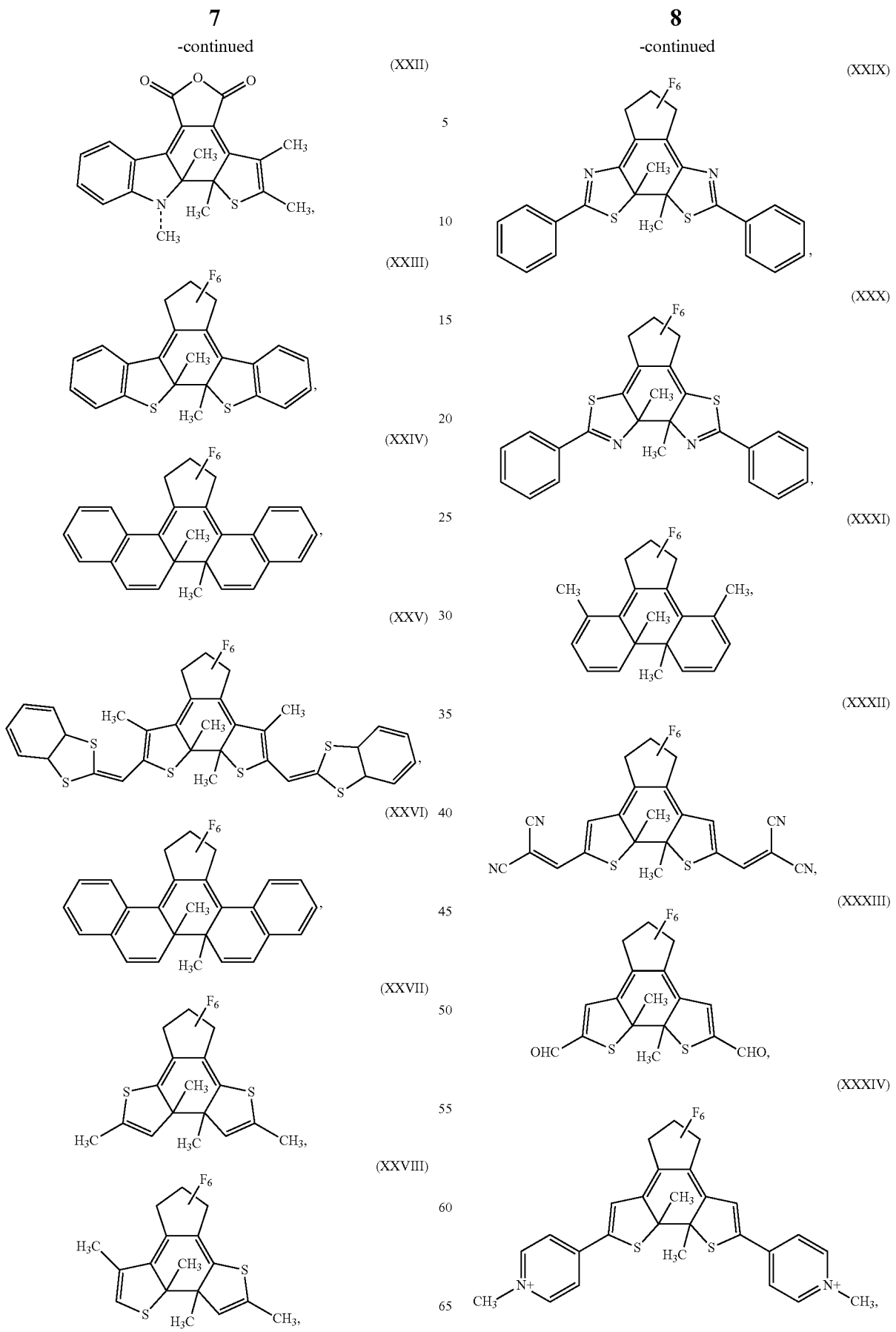

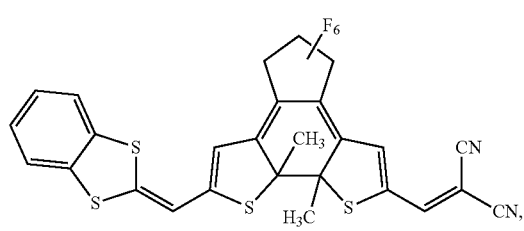
(XXXV)

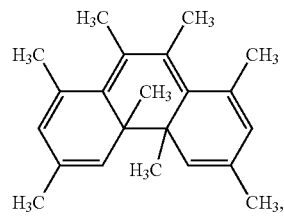
(XXXX)

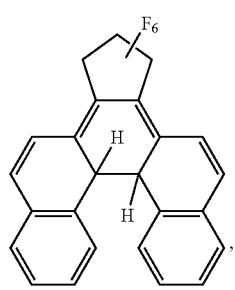
(XXXVI)

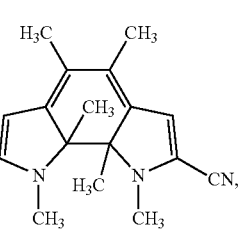
(XXXXI)

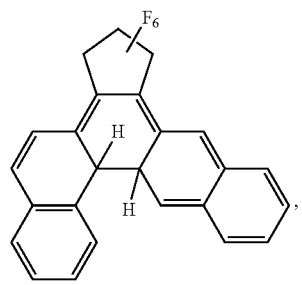
(XXXVII)

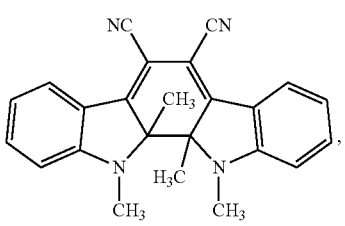
(XXXXII)

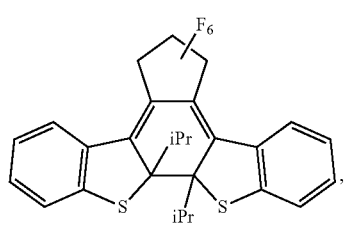
(XXXVIII)

where iPr represents isopropyl;

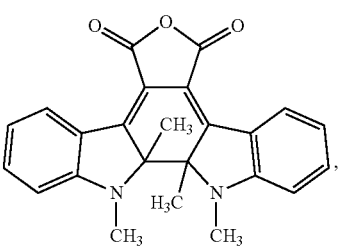
(XXXXIII)

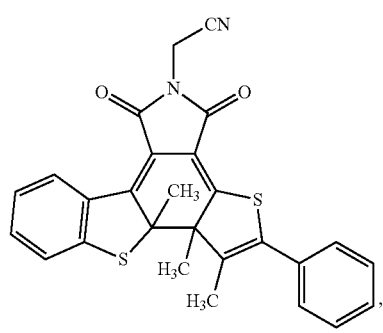
(XXXIX)

and combinations comprising at least one of the foregoing diarylethenes.

Diarylethenes with five-membered heterocyclic rings have two conformations with the two rings in mirror symmetry (parallel conformation) and in $C_2$ (antiparallel conformation). In general, the population ratio of the two conformations is 1:1. In one embodiment, it is desirable to increase the ratio of the antiparallel conformation to facilitate an increase in the quantum yield, which is further described in detail below. Increasing the population ratio of the antiparallel conformation to the parallel conformation can be accomplished by covalently bonding bulky substituents such as the —($C_1$-$C_5$ alkyl)COOH substituent to diarylethenes having five-membered heterocyclic rings.

In another embodiment, the diarylethenes can be in the form of a polymer having the general formula (XXXXIV) below. The formula (XXXXIV) represents the open isomer form of the polymer.

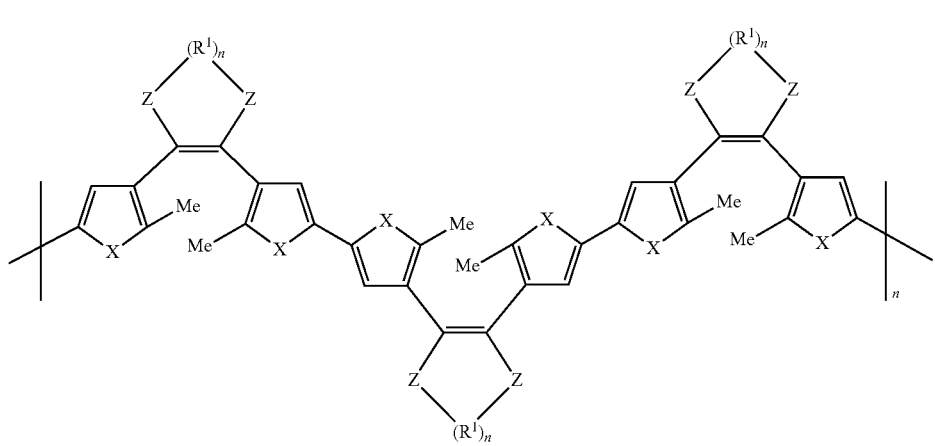

where Me represents methyl, $R^1$, X and Z have the same meanings as explained above in formulas (XI) through (XV) and n is any number greater than 1.

Polymerizing the diarylethenes can also be used to increase the population ratio of the antiparallel conformations to the parallel conformations.

The diarylethenes can be reacted in the presence of light. In one embodiment, an exemplary diarylethene can undergo a reversible cyclization reaction in the presence of light according to the following equation (I):

(I)

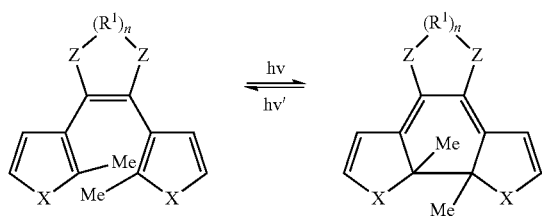

where X, Z $R^1$ and n have the meanings indicated above; and wherein Me is methyl. The cyclization reaction can be used to produce a hologram. The hologram can be produced by using radiation to react the open isomer form to the closed isomer form or vice-versa.

A similar reaction for an exemplary polymeric form of diarylethene is shown below in the equation (II)

(II)

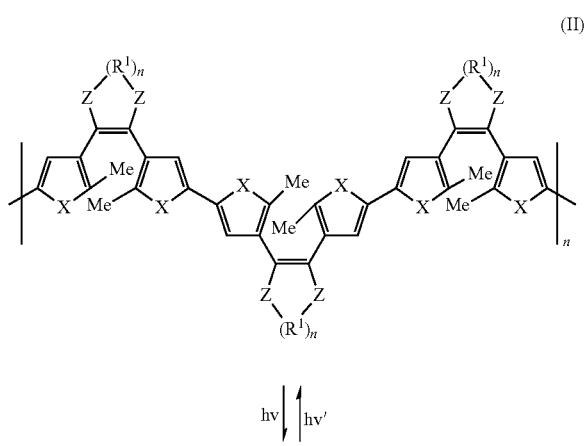

-continued

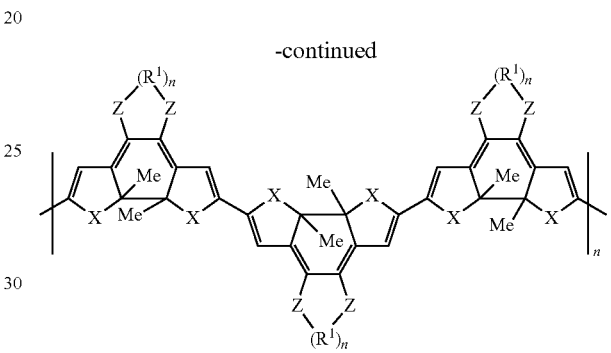

where X, Z $R^1$ and n have the meanings indicated above; and wherein Me is methyl.

Nitrones can also be used as holographic photoreactive dyes in the holographic storage media. Nitrones have the general structure shown in the formula (XXXXV):

(XXXXV)

An exemplary nitrone generally comprises an aryl nitrone structure represented by the formula (XXXXVI):

(XXXXVI)

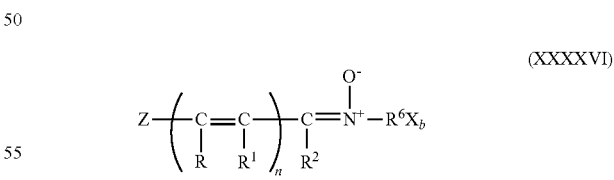

wherein Z is $(R^3)_a$-Q-$R^4$— or $R^5$—; Q is a monovalent, divalent or trivalent substituent or linking group; wherein each of R, $R^1$, $R^2$ and $R^3$ is independently hydrogen, an alkyl or substituted alkyl radical containing 1 to about 8 carbon atoms or an aromatic radical containing 6 to about 13 carbon atoms; $R^4$ is an aromatic radical containing 6 to about 13 carbon atoms; $R^5$ is an aromatic radical containing 6 to about 20 carbon atoms which have substituents that contain hetero atoms, wherein the hetero atoms are at least one of oxygen, nitrogen or sulfur; $R^6$ is an aromatic hydrocarbon radical containing 6 to about 20 carbon atoms; X is a halo, cyano, nitro, aliphatic acyl, alkyl, substituted alkyl having 1 to about 8 carbon atoms, aryl having 6 to about 20 carbon atoms, carbalkoxy, or an electron withdrawing group in the ortho or para position selected from the group consisting of

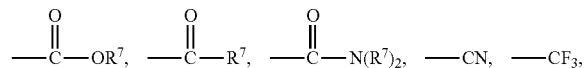

where $R^7$ is a an alkyl radical having 1 to about 8 carbon atoms; a is an amount of up to about 2; b is an amount of up to about 3; and n is up to about 4.

As can be seen from formula (XXXXVI), the nitrones may be α-aryl-N-arylnitrones or conjugated analogs thereof in which the conjugation is between the aryl group and an α-carbon atom. The α-aryl group is frequently substituted, most often by a dialkylamino group in which the alkyl groups contain 1 to about 4 carbon atoms. The $R^2$ is hydrogen and $R^6$ is phenyl. Q can be monovalent, divalent or trivalent according as the value of "a" is 0, 1 or 2. Illustrative Q values are shown in the Table 1 below.

TABLE 1

| Valency of Q | Identity of Q |
|---|---|
| Monovalent | fluorine, chlorine, bromine, iodine, alkyl, aryl; |
| Divalent | oxygen, sulphur, carbonyl, alkylene, arylene. |
| Trivalent | Nitrogen |

It is desirable for Q to be fluorine, chlorine, bromine, iodine, oxygen, sulfur or nitrogen.

Examples of nitrones are α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenylnitrone, or the like, or a combination comprising at least one of the foregoing nitrones. Aryl nitrones are particularly useful in the compositions and articles disclosed herein. An exemplary aryl nitrone is α-(4-diethylaminophenyl)-N-phenylnitrone.

Upon exposure to electromagnetic radiation, nitrones undergo unimolecular cyclization to an oxaziridine as shown in the structure (XXXXVII)

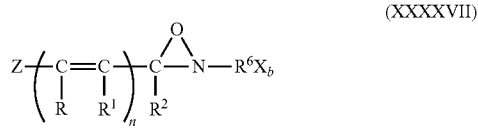

(XXXXVII)

wherein R, $R^1$, $R^2$, $R^6$, n, $X_b$ and Z have the same meaning as denoted above for the structure (XXXXVI).

In addition to the binder and the holographic photoreactive dye, the holographic recording medium may include any of a number of additional components, including but not limited to heat stabilizers, antioxidants, light stabilizers, plasticizers, antistatic agents, mold release agents, additional resins, binders, and the like, as well as combinations of any of the foregoing components.

In one exemplary embodiment, the holographic recording medium is extruded as a relatively thin layer or film, e.g., having a thickness of 0.5 to 1000 microns. In another exemplary embodiment, a layer or film of the holographic recording medium is coated onto, co-extruded with, or laminated with a support. The support may be a planar support such as a film or card, or it may be virtually any other shape as well. In yet another exemplary embodiment, the holographic medium may be molded or extruded into virtually any shape capable of being fabricated by plastic manufacturing technologies such as solvent-casting, film extrusion, biaxial stretching, injection molding and other techniques known to those skilled in the art. Still other shapes may be fabricated by post-molding or post-extrusion treatments such as cutting, grinding, polishing, and the like.

The hologram may be recorded in the holographic medium by any of a number of exposure set-ups. Transmission holograms may be recorded by directing the object light source and the reference light source onto the same surface of the holographic recording medium. A simplified diagram of an exemplary embodiment of an apparatus for recording a transmission hologram is shown in FIG. 1. In this configuration, the output from a laser 10 is divided into two equal beams by beam splitter 20. One beam, the signal beam 40, is incident on a form of spatial light modulator (SLM), deformable mirror device (DMD), or object to be recorded 30, which imposes the data to be stored in signal beam 40. An SLM or DMD device may be composed of a number of pixels that can block or transmit the light based upon input electrical signals. Each pixel can represent a bit or a part of a bit (a single bit can consume more than one pixel of the SLM or DMD 30) of data to be stored. The output of SLM/DMD/object 30 is then incident on the storage medium 60. The second beam, the reference beam 50, is transmitted all the way to storage medium 60 by reflection off first mirror 70 with minimal distortion. The two beams are coincident on the same area of holographic medium 60 at different angles. The net result is that the two beams create an interference pattern at their intersection in the holographic medium 60. The interference pattern is a unique function of the data imparted to signal beam 40 by SLM/DMD/object 30.

Figure 2:
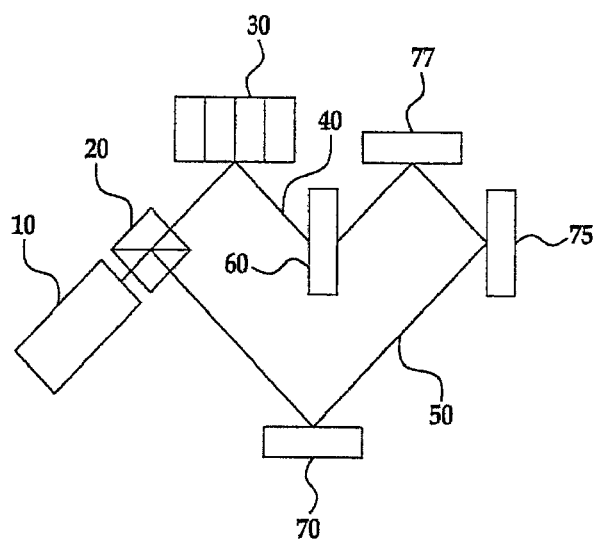
FIG. 2 represents a simplified diagram of an apparatus for recording a reflection hologram.

Reflection holograms may be recorded by directing the object light source and the reference light source onto different surfaces of the recording medium, such as opposite sides of a holographic recording film. However, the refraction produced by the interference fringes that are often formed by such exposure results may only be viewable at a wavelength close to the exposure wavelength, in which case the use of a light-blocking layer as described herein may adversely impact the viewability of the hologram. In one exemplary embodiment, a reflection hologram produced by directing the object light source and reference light source onto different sides of the recording medium may be viewable in a different wavelength than the recording wavelength if the angle of incidence (θ) of the light beams onto the holographic medium is high (e.g., greater than or equal to about 40°). Since such angles may exceed the critical angle of incidence of the holographic recording medium, a light refracting medium such as a prism may be placed in intimate contact with the surface of the holographic recording medium in order to direct the exposure hologram into the holographic medium at high angles of incidence to produce a reflection hologram that can be viewed at a wavelength other than the exposure wavelength, as disclosed in copending, U.S. application Ser. No. 13/028,529 filed Feb. 16,2011 in the names of Michael Takemori et al entitled "Holographic Recording Method", the disclosure of which is incorporated herein by reference in its entirety. A simplified diagram of an exemplary embodiment of an apparatus for recording a reflection hologram is shown in FIG. 2. In this configuration, the output from a laser 10 is divided into two equal beams by beam splitter 20. One beam, the signal beam 40, is incident on a form of spatial light modulator (SLM), digital light projector (DLP), deformable mirror device (DMD), mask or object to be recorded 30, which imposes the image or data to be stored in signal beam 40. An SLM or DMD device may be composed of a number of pixels that can block or transmit the light based upon input electrical signals. Each pixel can represent a bit or a part of a bit (a single bit can consume more than one pixel of the SLM or DMD 30) of data to be stored. The output of SLM/DMD/object 30 in the form of the signal beam enters holographic recording medium 60. The second beam, the reference beam 50, is transmitted to holographic recording medium 60 by reflection off mirrors 70, 75, and 77 with minimal distortion. The two beams are coincident on the same area of holographic recording medium 60 from different directions. The net result is that the two beams create an interference pattern at their intersection in the holographic recording medium 60. The interference pattern is a unique function of the data or image information imparted to signal beam 40 by SLM/DMD/object 30.

In one embodiment, the latent light-blocking compound is disposed in the holographic recording medium. In another embodiment, the latent light-blocking compound is disposed in separate layer. In either of these embodiments, a layer or material comprising the latent light-blocking compound may be referred to herein as a "light blocking layer or material" even though it doesn't perform it's light-blocking function until after conversion of the first compound to the converted compound. Also, as used herein, "light" refers not only to light in the visible spectrum, but to actinic radiation of any wavelength effective to produce a change in the holographic photoreactive dye's optical properties capable of producing a hologram when exposed to mutually coherent beams of the actinic radiation. Generally, the light blocking layer should block transmission of light at wavelength(s) to which the holographic photoreactive dye in the holographic recording medium is sensitive while allowing transmission of light at other wavelengths for viewing the recorded hologram. The term "opaque", as used herein, means that the light-blocking compound or layer absorbs sufficient levels of light at the wavelength(s) to which the holographic photoreactive dye is sensitive to provide a hologram with a desired level of stability; complete or absolute opacity is not required. The level of light blocking that is provided is a function not only of the spectral absorbance characteristics of the light-blocking compound, but also of its concentration in a light-blocking layer as well as the thickness of the light-blocking layer. In one exemplary embodiment, a light blocking layer or material should have an absorbance greater than or equal to about 2 in the wavelengths to which the holographic photoreactive dye is sensitive. In another exemplary embodiment, a light blocking layer or material should have an absorbance greater than or equal to about 3 in the wavelengths to which the holographic photoreactive dye is sensitive. In a further exemplary embodiment, a light-blocking layer or material has an absorbance in relevant viewing wavelength(s) of less than 0.2. In another further exemplary embodiment, a light-blocking layer or material has an absorbance in relevant viewing wavelength(s) of less than 0.1. In yet another further exemplary embodiment, a light-blocking layer or material has an absorbance in relevant viewing wavelength(s) of less than 0.01. In an exemplary embodiment, absorbance of a light blocking layer or material extends to wavelengths above the wavelength at which the holographic photoreactive dye is written. In a more specific exemplary embodiment, a light blocking layer or material has less than or equal to 20% transmittance up to a wavelength of about 20 nm higher than the writing wavelength. In another more specific exemplary embodiment, a light blocking layer or material has less than or equal to 20% transmittance up to a wavelength of about 30 nm higher than the writing wavelength. Also, some holographic photoreactive dyes exhibit sensitivity in lower wavelengths below the writing wavelength, such as in the UV range. For such dyes, a light blocking layer or material should also block light in those wavelengths, which may necessitate a combination of light-blocking compounds or moieties in the light blocking layer or material.

Generally, broader ranges of wavelengths of low absorbance, outside of the range to which the holographic photoreactive dye is sensitive, will provide enhanced viewability of the hologram. Accordingly, a sharp transition (i.e., a steep peak or drop-off in an absorbance plot) between wavelengths at which the light-blocking layer blocks light and wavelengths where it transmits light may enhance viewability. In one exemplary embodiment, the difference between the wavelength at which the light-blocking layer or material transmits 20% (20% transmittance) of the light and the wavelength at which it transmits 80% of the light (80% transmittance) is less than or equal to about 50 nm. In another exemplary embodiment, the difference between the wavelength at which the light-blocking layer or material transmits 20% (20% transmittance) of the light and the wavelength at which it transmits 80% of the light (80% transmittance) is less than or equal to about 30 nm. In yet another exemplary embodiment, the difference between the wavelength at which the light-blocking layer or material transmits 20% (20% transmittance) of the light and the wavelength at which it transmits 80% of the light (80% transmittance) is less than or equal to about 15 nm.

The light-blocking layer or material may include a polymeric binder, including but not limited to any of the polymeric binders described above with respect to the holographic recording medium.

In one embodiment, a light-blocking layer is extruded as a relatively thin layer or film, e.g., having a thickness of 0.5 to 1000 microns, which is thermally or adhesively laminated to the holographic layers prior to hologram recording. In other embodiment(s), a layer or film of the light blocking material is coated onto, co-extruded with, thermally or adhesively laminated with a support. The support may be a planar support such as a film or card, or it may be virtually any other shape as well.

The light-blocking compound into which the latent light-blocking compound is converted can be chosen from any of a number of known light-absorbing compounds, provided that a suitable functional group is attached thereto that can be removed or reacted to form the light-absorbing compound. The particular compound of course depends on the spectral sensitivity of the holographic photoreactive dye that the light-blocking compound is supposed to protect from exposure after the hologram has been formed.

Exemplary optically absorptive species include, but are not limited to organic dyes, organometallic dyes, absorptive polymers, polymer-bound organic or organometallic dyes, and combinations of any of the above. Several exemplary classes of organic dye molecules include 2-hydroxybenzophenones (e.g., (2-hydroxyphenyl)(phenyl)methanone, A), formamides (e.g., N-(2-ethoxy-phenyl)-N'-(2-ethyl-phenyl)- oxalamide, B), quinones (e.g., anthraquinones (1-[4-(1-methyl-1-phenyl-ethyl)-phenoxy]-anthraquinone, C), salicylates (e.g., 2-hydroxy-benzoic acid 4-tert-butyl-phenyl ester, D), benzotriazoles (e.g. 2-benzotriazol-2-yl-6-(1,1-dimethylpropyl)-4-(1,1,3,3-tetramethyl-butyl)-phenol, E), triazines (e.g., 2-(4,6-diphenyl-1,3,5-triazin-2-yl)-5-[(hexyl)oxy]-phenol, F), o-Hydroxy pyrophthalone derivatives (eg., 3-hydroxy-2-(pyridin-2-yl)-1H-inden-1-one), G), Hydroxyarylidene Barbituric acid derivatives (eg., 5-(2-hydroxybenzylidene)-1,3-dimethylpyrimidine-2,4,6(1H,3H, 5H)-trione), H) Hydroxyarylidene thiobarbituric acid derivatives (5-(2-hydroxybenzylidene)-1,3-dimethyl-2-thioxodihydropyrimidine-4,6(1H,5H)-dione, I), Benzoxazole derivatives (eg., 2-(benzo[d]oxazol-2-yl)phenol), J), Benzthiazole derivatives (2-(benzo[d]thiazol-2-yl)phenol), K).

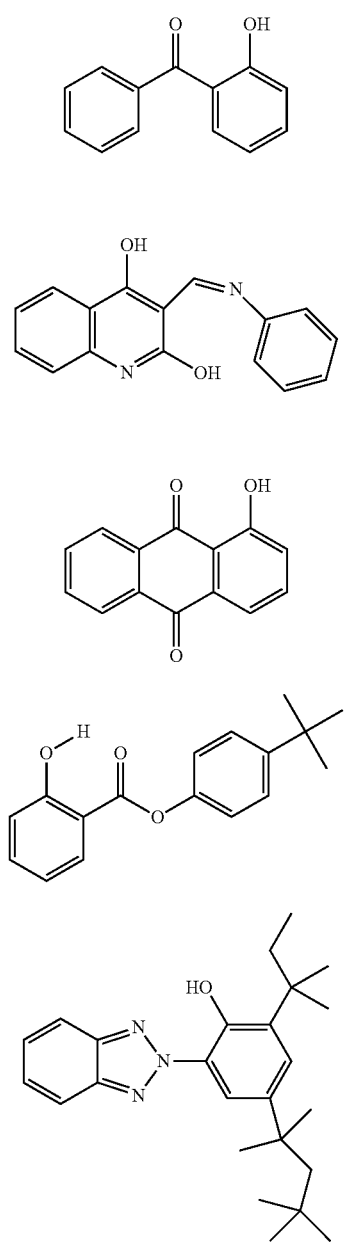

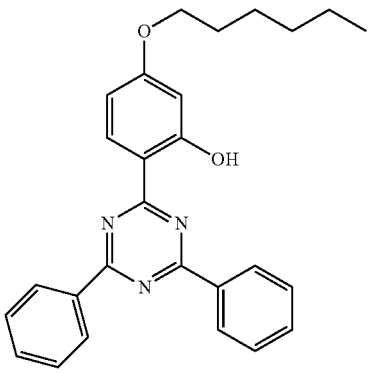

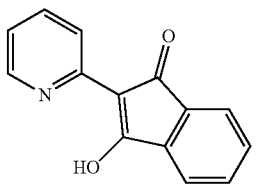

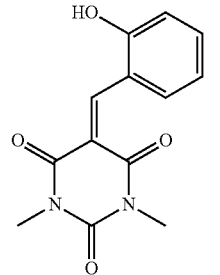

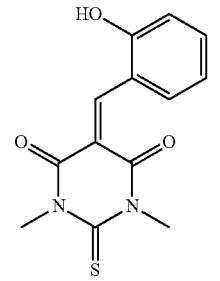

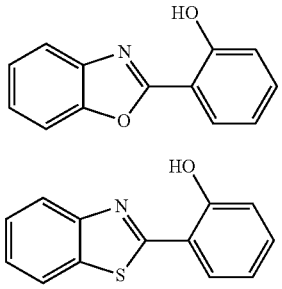

As described herein, a first compound (i.e., latent light-blocking compound) is converted to a light-blocking compound after the holographic photoreactive dye in the holographic recording medium has been exposed to light to form a hologram. Although the light-blocking compound can be formed in situ from structurally dissimilar precursor compound(s), in a number of exemplary embodiments it will be formed from a chromophore compound having one or more groups thereon that can be reacted to cause the spectral absorbance of the compound to shift toward longer or shorter wavelengths, thereby providing the spectral absorbance properties desired for the light-absorbing compound. Such reactive groups can undergo a reaction in response to exposure to a chemically reactive component such as an acid, base, oxidizing agent, or reducing agent. Chromophores having such reactive groups are well-known in the field of silver halide imaging, where they are known as dye-forming couplers. Dye-forming couplers in the field of silver halide imaging have groups thereon that are reactive with oxidized developer compound that was oxidized by reaction with grains of silver halide that have been exposed to light. Such compounds are very well-known and do not require further exemplification herein. A more detailed description of them can be found in T. H. James, The Theory of the Photographic Process, 4$^{th}$ ed., New York: The Macmillan Company, 1977, the disclosure of which is incorporated herein by reference in its entirety. Other chemical-based processes for in situ formation of chromophores are known as well, and can be practiced with the materials and processes described herein.

Although subjecting a holographic article to treatment with chemicals to generate a light-blocking compound to protect the hologram can be effective, the handling and processing of such chemicals can create additional expense and complexity associated with handling and processing of the various chemicals involved. Therefore, in exemplary embodiments, the latent light-blocking compound is converted into the light-blocking compound by exposure to heat or light. Various groups can be appended to or included as part of chromophore molecules that will react to cause an absorbance wavelength shift upon exposure to heat or light, as is known in the art. Exemplary groups include endoperoxides that use dioxygen to form a cycloadduct from a diene-containing chromophore, or -benzoyl, -tosyl, -t-butoxy (e.g., t-butoxycarbonyl), -nitrophenyl, and -veratroyl groups used to protect oxygen atoms on aromatic ring structures (e.g., phenolic oxygens) in a chromophore molecule).

Endoperoxides can be incorporated into aromatic or diene-containing molecules. Endoperoxides are formed by the reaction of molecular oxygen (O$_2$) with diene or aromatic carbons to form a ring made up of a C—O—O—C bridge within the parent molecule. This reaction occurs via a sensitization mechanism wherein a dye molecule absorbs an incident photon and transfers its excited state energy to a molecule of ground state oxygen (triplet oxygen) to form excited state oxygen (singlet oxygen). The singlet oxygen then attacks the dye molecules' reactive functionalities such as mono- or dienes or aromatic double bonds, and adds to the molecule as an endoperoxide. The criteria for sensitization is that the triplet energy (T$_1$) of the dye should be greater than 22 kcal/mol, which allows the singlet oxygen to be generated via tripet-to-triplet energy transfer (Dexter energy transfer) from the dye to the ground state oxygen when the oxygen molecule collides with the dye. In many systems, the endoperoxide ring will spontaneously open to form hydroxyl or peroxy groups, but in certain cases, the endoperoxide moiety can be quite stable. Because the ring contains molecular oxygen, if the C—O bonds are cleaved (e.g., thermally), the dioxygen leaving group will diffuse into the atmosphere and return the parent compound (FIG. 10). Additionally, the formation of an endoperoxide tends to blue-shift the absorption of the parent species to the UV-B/C range of the spectrum (<300 nm), thus making it a compelling option for a latent blocking dye. An exemplary reaction schematic for conversion of an endoperoxide-containing latent light-blocking compound to a light-blocking compound is shown below:

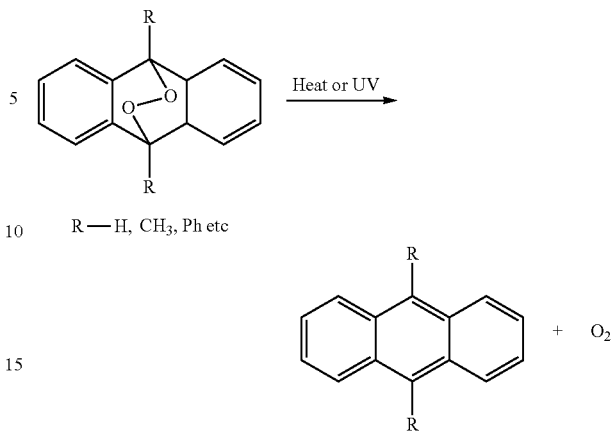

R — H, CH$_3$, Ph etc

In an exemplary embodiment, a latent light-blocking compound having an endoperoxide group has the formula (1)

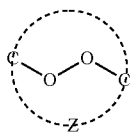

wherein Z represents the atoms necessary to complete a substituted or unsubstituted aromatic ring structure. A wide variety of aromatic ring structures for Z in formula (1) can be utilized depending on the desired properties of the chromophore molecule after the endoperoxide group has been reacted/removed from the molecule. Chromophore molecules are well-known in the art as described above. Exemplary aromatic ring structures represented by Z in formula (1) have 10 to 22 carbon atoms and include anthracene derivatives (e.g., 9,10-diphenylanthracene, 9,10-dimethylanthracene), pteridine triones (e.g., 1,3,8-trimethyl-6-phenylpteridine-2,4,7(1H,3H,8H)-trione), highly substituted napthalenes (1,4-diphenylnapthalene or 1,4-dimethoxynapthalene) and various derivatives of phenanthrene, tetracene, Benz[a]anthracene, Benzo[a]fluorene, Benzo[c]phenanthrene, Chrysene, Fluoranthene, Tetracene, Triphenylene, and 5 ring derivatives such as pentacene. In another exemplary embodiment, a latent light-blocking compound having an endoperoxide group is a pteridine trione having the formula (2)

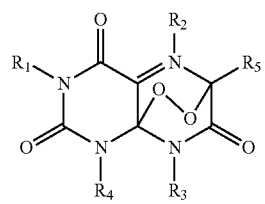

wherein R$_1$, R$_2$, R$_3$, and R$_4$ each independently represents substituted or unsubstituted alkyl (e.g., of 1 to 4 carbon atoms) or substituted or unsubstituted aryl (e.g., of 6 to 10 carbon atoms), and R$_5$ represents substituted or unsubstituted aryl (e.g., of 6 to 10 carbon atoms). In a still further exemplary embodiment, R$_5$ represents 4-methoxyphenyl, which compound could be synthesized by reacting 5,6-diamino-1,3- dimethyluracil hydrate and ethyl 2-(4-methoxyphenyl)-2-oxoacetate to form the corresponding imine product, followed by condensation of the imine and then N-methylation reaction with methyl iodide to yield the corresponding methoxyderivative of pteridine trione (MeO-PT). The ethyl 2-(4-methoxyphenyl)-2-oxoacetate could be prepared from the reaction of methoxybenzene and methylester carbonyl chloride In yet another exemplary embodiment, a photostabilizer such as a singlet oxygen scavenger (e.g., 1,4-diazabicyclo[2.2.2]octane (i.e., DABCO), α-tocopherol, butazate, Naugard® 445), a triplet quencher (e.g., trans-stilbene), a radical scanger (e.g., 2,2,6,6-tetramethylpiperidin-2-yl)oxidanyl (i.e., TEMPO)), or combinations thereof, is used in conjunction with the light-blocking compound such as a pteridine trione compound.

The use of functional groups such as benzoyl groups to protect phenolic oxygen atoms is known in the art, and is described for example in T. Kanda et al., "Photoinduced Proton Transfer in 2-(2'-hydroxynaphthalenyl)-benzoxazole: Observations of Fluorescence with a Small Stokes Shift Induced by Excited State Intramolecular Proton Transfer", *Bull. Chem. Soc. Japan* 2009, 82(1), 118-20, and C. Kocher et al., "'Latent' Ultraviolet Light Absorbers", *J. Mat. Chem.*, 2003, 13, 2-15, the disclosures of which are incorporated herein by reference in their entirety. The use of endoperoxides that use dioxygen to form a cycloadduct from a diene-containing chromophore is also known, and is described for example in N. Turro et al., "Mechanism of Thermolysis of Endoperoxides of Aromatic Compounds Activation Parameters, Magnetic Field and Magnetic Isotope Effects", *J. Am. Chem. Soc.*, 1981, 103, 7218-24, the disclosure of which is incorporated herein by reference in its entirety. For example, the benzoyl protected chromophore red shifts once the group is removed by light or heat and the hydrogen on the newly formed phenol has the ability to hydrogen bond as shown in the following scheme:

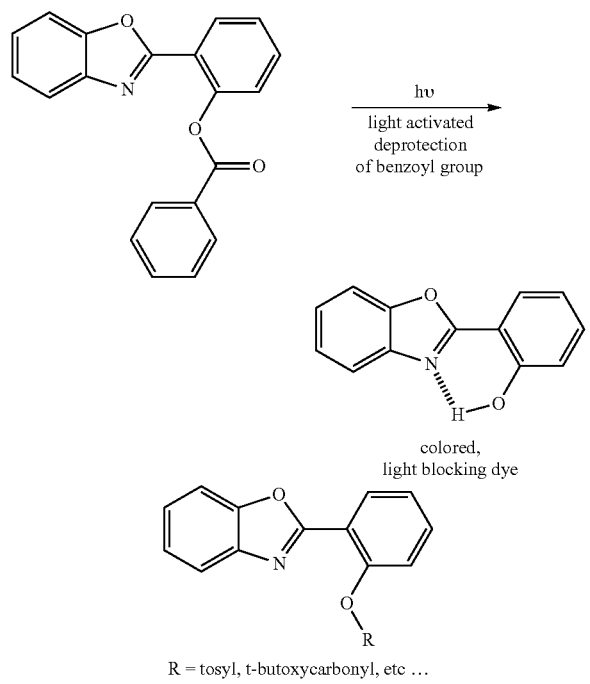

R = tosyl, t-butoxycarbonyl, etc ...

Therefore, in an exemplary embodiment, a latent light-blocking compound is an aryloxy compound having the formula (3)

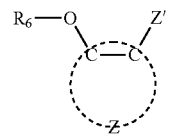

wherein $R_6$ represents a moiety that includes a functional group that can be cleaved from the oxygen atom to which it is attached to form a hydroxyl group, Z represents the atoms necessary to complete an aromatic ring structure, and Z' represents the atoms necessary to complete a conjugated structure with the proviso that Z further includes a moiety capable of hydrogen bonding to the hydroxyl group formed by the cleavage of $R_6$. Examples of cleavable functional groups that $R_6$ can form along with the oxygen atom to which it is attached include cleavable ester groups, cleavable carbonate groups, or cleavable sulfonate groups, and —$R_6$ can be represented by the structure -L-$R_8$ wherein L, together with the oxygen to which L is attached, represents the atoms necessary to form a cleavable ester, carbonate, or sulfonate linkage, and $R_8$ represents an organic radical. Various organic radicals useful as $R_8$ can include, for example, substituted or unsubstituted aryl of 6 to 10 carbon atoms (e.g., phenyl, 4-nitrophenyl, alkyl of 4 to 10 carbon atoms (e.g., tertiary butyl). In another exemplary embodiment, $R_6$ represents a substituted or unsubstituted benzoyl group, a substituted or unsubstituted alkoxycarbonyl group (e.g., tertiary-butoxycarbonyl), the atoms necessary to complete a tosyl group, or a 4-nitrophenyl carbonyl group. Z represents the atoms necessary to complete an aromatic ring structure, for example having 6 to 20 carbon atoms. The aromatic ring structure may be substituted or unsubstituted, and may also contain non-carbon heteroatoms such as nitrogen. Examples of aromatic ring groups formed by Z include, but are not limited to, benzene rings, naphthalene rings, anthracene rings, pyridine rings, quinolone rings. Z' represents the atoms necessary to complete a conjugated structure, with the proviso that it also includes a moiety capable of hydrogen bonding with the hydroxyl group formed by the cleavage of $R_6$. The conjugated structure formed by Z' involves conjugation with the bond between the carbon atoms to which —$OR_6$ and Z' are attached, and can be formed, for example, by an ortho-positioned carbonyl group or by an aromatic group, as shown in the dyes structures exemplified as structures (A)-(K) above. Moieties capable of hydrogen bonding to ortho-positioned aromatic hydroxyl groups, and useful moieties for providing same, are well-known in the chromophore art, and include oxygen, nitrogen, or sulfur atom-containing groups. Examples of useful groups formed by Z' along with the rest of structure (3) to provide conjugation and hydrogen bonding include carbonyl groups (e.g., 2-hydroxybenzophenones such as structure A disclosed above, quinones such as structure C disclosed above, salicylates such as structure D disclosed above, hydroxyarylidene barbituric acid derivatives such as structure H disclosed above, or hydroxyarylidene thiobarbituric acid derivatives such as structure I disclosed above); and nitrogen atoms (e.g., formamides such as structure B disclosed above, benzotriazoles such as structure E disclosed above, benzoxazole derivatives such as structure J disclosed above, benzothiazole derivatives such as structure K disclosed above, triazines such as structure F disclosed above.

An alternative approach to heat activation of a latent blocking dye compound is light-exposure. This approach has the advantage of avoiding exposure of written holograms to thermal stresses which could cause local diffusion of dye molecules and the loss of hologram fidelity due to fringe blurring; however, care should be taken to avoid the photoactivation itself from further exposing hologram formed by the holographic photoreactive dye, which could degrade the hologram. For example, in one exemplary embodiment described above, the holographic photoreactive dye is sensitive to light in the short blue wavelengths (e.g., 405 nm), which can be beneficial aesthetically because such dyes may provide little intrinsic coloration to the holographic article. The use of a latent light-blocking compound that can be photoactivated by light at wavelengths longer than the wavelength(s) to which the holographic photoreactive dye is sensitive would help avoid hologram degradation; however, such light-blocking compounds may also have intrinsic coloration that could adversely affect hologram aesthetics and/or viewability. In one exemplary embodiment, a holographic recording medium having a holographic photoreactive dye that is sensitive to both blue and UV light is protected by a UV light-blocking layer over the holographic recording medium and a photoactivatable latent blue light-blocking layer over the UV light-blocking layer. Such an article can be exposed with blue light (e.g., 405 nm) to form a hologram, followed by activation of the latent blue light-blocking layer by exposure to a UV light source. The UV light-blocking layer allows for the transmission of blue light during exposure to form the hologram, and blocks the subsequent exposure to UV light that is used to activate the latent blue light-blocking compound.

Photo-latent absorber molecules, specifically photolatent UV absorbers are well-known for use in specialty plastics manufacturing, including coating industries, anti-microbial materials, optical data storage and photolithography applications. See, for example, US Pat. Appl. Publ. No. 2009/0162307 A1 or J. Literák et al., "1-Oxoindan-2-yl and 1,3-dioxoindan-2-yl esters as Photoremovable Protecting Groups", *J. Photochem. Photbiol. A: Chem.*, 2008, 194(1), 59-66, the disclosures of which are incorporated herein by reference in their entirety. These chemistries can be adapted to the blue region of the spectrum for use as latent light-blocking compounds for a blue-sensitive holographic photoreactive dye as described herein. Various protecting group chemistries can be used, including but not limited to -benzoyl, -phenacyl, -tosyl, -t-butoxy (e.g., t-butoxycarbonyl), -nitrophenyl, and -veratroyl. While these chemistries tend to generate smaller blue shifts than those seen for endoperoxide formation, peak shifts of 60-100 nm have been demonstrated. Various parent dye families can be used with benzoate protection, including but not limited to benzophenones, benzothiazoles, benzoxazoles, and barbituric acid derivatives. Examples of photactivatable latent light-blocking compounds utilizing benzoate (i.e., benzoyl) groups include 5-methoxy-(2-benzoyloxy)benzophenone, 2-(2'-benzoyloxyphenyl)benzoxazole, and 2-(2'-benzoyloxyphenyl)benzothiazole, 5-(4-benzoyl-benzylidene)-pyrimidine-2,4,6-trione, 5-(2-benzoyl-benzylidene)-pyrimidine-2,4,6-trione, and benzoic acid 4-(1,3-dimethyl-2,4,6-trioxo-tetrahydropyrimidin-5-ylidenemethyl)-phenyl ester. Examples of photoactivatable latent light-blocking compounds utilizing t-butoxycarbonyl groups include 5-methoxy-(2-t-butoxycarbonyl)benzophenone and 5-(4-t-butoxybenzylidene)-1,3-dimethyl-pyrimidine-2,4,6-trione. Examples of latent light-blocking compounds utilizing tosyl groups include 2-(2-(p-toluenesulfonyloxy)-5-methylphenyl)benzotriazole.

In some exemplary embodiments, the light-blocking compound blocks only a portion of the range of wavelengths to which the holographic photoreactive dye is sensitive, in which case it may be used in combination with other light-absorbing compounds. Such other light-absorbing compounds may be latent (i.e., convertible) light-absorbing compounds like the first compound, but they may also be compounds that do not undergo any conversion provided that they do not have significant absorbance at the exposure wavelength(s). Such additional light-absorbing compounds may be used either in the layer comprising the first compound or in another layer. In one exemplary embodiment, such additional light-absorbing compounds may be UV absorbers. Myriad chemistries are available for UV light blocking and are known to those skilled in the art (e.g. Tinuvin®, Uvinil®, Cyasorb® UV blocking dye families).

In embodiments where the latent light-blocking compound is disposed in a layer or material separate from the holographic recording medium, the latent light-blocking compound may be disposed in a layer or material that is disposed directly onto the holographic recording medium, or it may have one or more other intervening layers between the holographic recording medium and the light blocking layer or material, as long as the light blocking compound is positioned to block light of the targeted wavelength(s) from reaching the holographic recording medium. In this regard, the use herein of the term "over" with respect to the light blocking layer being disposed over the holographic recording medium is intended to include both embodiments where it is disposed directly on the holographic recording medium as well as embodiments where there are one or more other intervening layers. The light blocking layer may be applied by any of a number of technologies, including but not limited to spray coating, dip coating, inkjet printing, screen printing, or pre-forming a light-blocking film using solvent-casting, film extrusion, biaxial stretching and other techniques known to those skilled in the art, and applying it to the holographic recording medium with a pressure-sensitive or other adhesive, heat laminating, static charge adhesion, or mechanically affixing it to the holographic recording medium. Additionally, in some exemplary embodiments, a protective transparent top layer may be applied over the light blocking layer to protect it and the other underlying layers.

Figure 3:
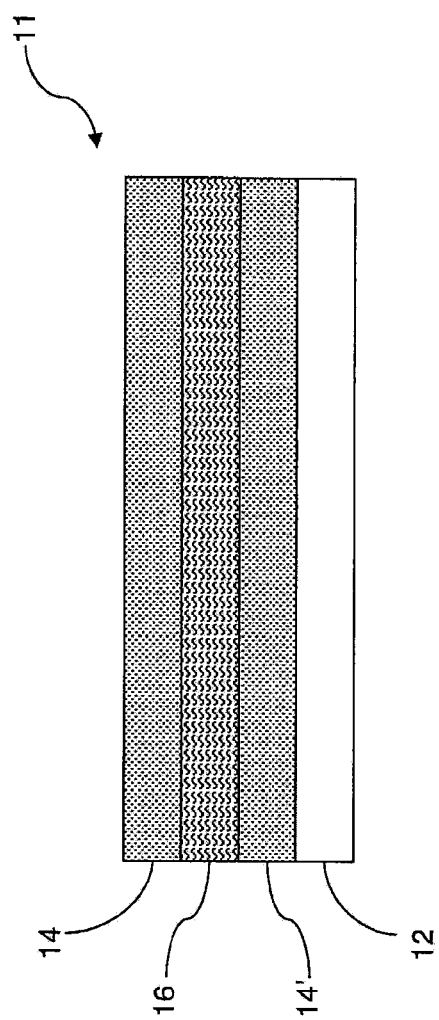
FIG. 3 represents a transmission hologram with a light-blocking layer, for viewing in transmission.

In an exemplary embodiment as shown in FIG. 3, an article 11 for recording a transmission hologram comprises support 12 having thereon light blocking layer 14', holographic recording layer 16, and light blocking layer 14. The support may be any transparent material, including but not limited to the materials described above as polymer binders for holographic recording media, glass, and the like. FIG. 3 depicts the light blocking layer 14 and light blocking layer 14 disposed over the entire area of the holographic medium 16. In another alternative embodiment, the light blocking layer need only be disposed over a portion of the holographic recording medium or a portion of the article, such as where a hologram is recorded in only a portion of the holographic recording medium or article.

Figure 4:
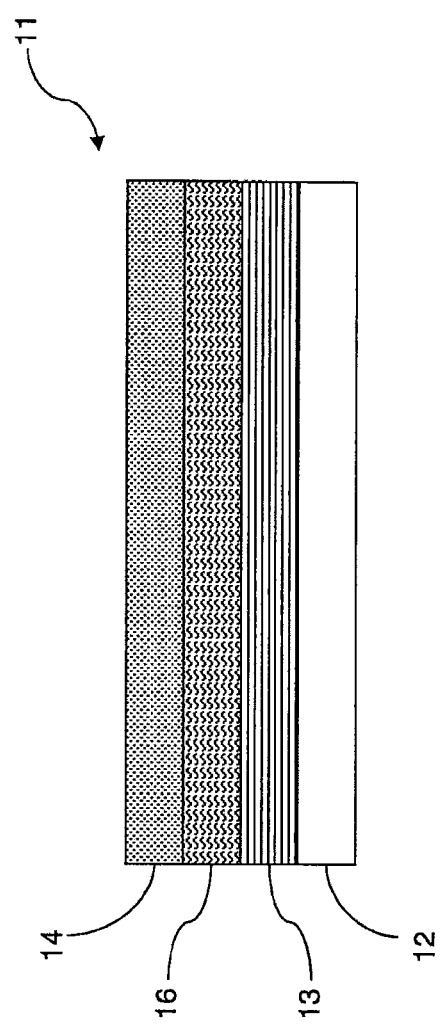
FIG. 4 represents a transmission hologram with a light-blocking layer, for viewing in reflection.

In another exemplary embodiment as shown in FIG. 4, an article 11 for recording a transmission hologram viewable as a reflection image comprises support 12 having thereon an opaque reflecting layer 13, transmission holographic recording layer 16, and light blocking layer 14. The support may be any transparent material, including but not limited to the materials described above as polymer binders for holographic recording media, glass, and the like. Although the hologram recorded in layer 16 will be a transmission image, the light source for viewing will be directed from above the article 11 through light blocking layer 14 and the transmission hologram recorded in layer 16, from where it will reflect off of reflecting layer 13 and exit through light blocking layer 14 where it will be viewed, appearing as a reflection hologram. Since no viewing light need enter from the underside of the article, support 12 may be transparent (if the reflective layer 13 is opaque) or support 12 may be opaque. In an exemplary embodiment, the reflecting layer 13 may not be completely opaque, in which case support 12 should be opaque.

Figure 5:
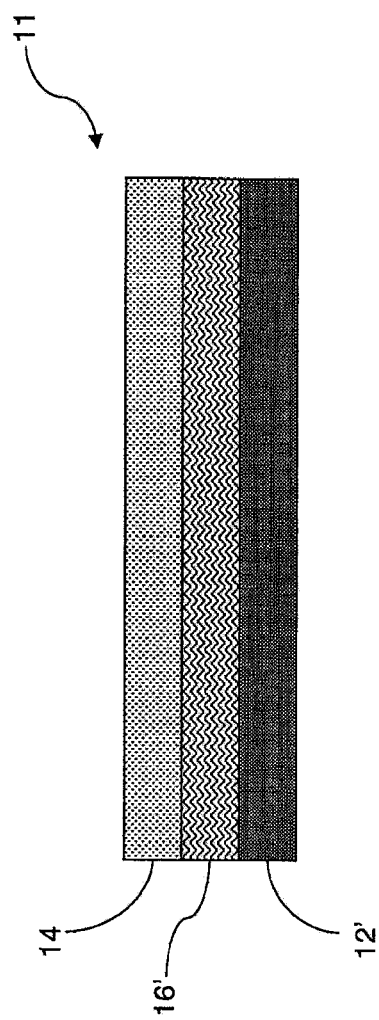
FIG. 5 represents a reflection hologram with a light-blocking layer.

In another exemplary embodiment as shown in FIG. 5, an article 11 for recording a reflection hologram viewable as a reflection image comprises opaque support 12' having thereon a reflection holographic recording layer 16', and light blocking layer 14. The support may be any material, including but not limited to the materials described above as polymer binders for holographic recording media, glass, and the like, and may include opacifying agents such as pigments. Alternatively, a light-blocking material such as an opaque coating or layer (not shown) may be disposed on either side of support 12' to render provide opacity.

Examples of Embodiments

In one embodiment, an article for recording a hologram can comprise:

a holographic recording medium comprising a transparent polymeric binder and a photoreactive dye dispersed therein; and a first compound, dispersed in the holographic recording medium or disposed over a first surface of the holographic recording medium from which surface the hologram is viewed, wherein said first compound is transparent to light in the wavelength range to which the photoreactive dye is sensitive and which is capable of being converted to a first converted compound that is opaque to light in the wavelength range to which the photoreactive dye is sensitive and transparent to light in a different wavelength range for viewing the hologram.

In another embodiment, a method for recording a hologram can comprise: exposing a holographic recording medium to mutually coherent interfering light beams to generate an interference fringe pattern, said holographic recording medium comprising a transparent polymeric binder and a photoreactive dye dispersed therein, said holographic recording medium being disposed in an article, said article further comprising a first compound dispersed in the holographic recording medium or disposed over a first surface of the holographic recording medium from which surface the hologram is viewed, wherein said first compound is transparent to light in the wavelength range to which the photoreactive dye is sensitive;

wherein said first compound is capable of being converted to a converted compound that is opaque to light in the wavelength range to which the photoreactive dye is sensitive and transparent to light in a different wavelength range for viewing the hologram.

In the various embodiments, (i) the first compound is disposed over a first surface of the holographic recording medium from which the surface is viewed; and/or (ii) the holographic recording medium is a holographic film; and/or (iii) the article further comprises a second compound disposed over a second surface of the holographic recording medium, wherein the second compound is the same as or different from the first compound and is transparent to light in the wavelength range to which the photoreactive dye is sensitive and which is capable of being converted to a second converted compound that is opaque to light in the wavelength range to which the photoreactive dye is sensitive and transparent to light in a different wavelength range for viewing the hologram; and/or (iv) the article further comprises a reflecting material over a second surface of the holographic recording medium; and/or (v) the article further comprises a reflecting layer or material disposed over a second surface of the holographic recording medium that is opaque in the wavelength range to which the photoreactive dye is sensitive; and/or (vi) the article further comprises a light-blocking material disposed over a second surface of the holographic recording medium; and/or (vii) the holographic recording medium is a holographic film; and/or (viii) the first compound is an endoperoxide having the formula:

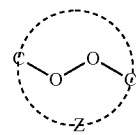

wherein Z represents the atoms necessary to complete an aromatic ring structure; and/or (ix) the first compound is a pteridine trione having an endoperoxide moiety; and/or (x) the first compound has the formula:

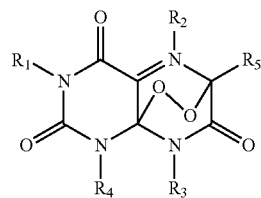

wherein $R_1$, $R_2$, $R_3$, and $R_4$ each independently represents substituted or unsubstituted alkyl (e.g., of 1 to 4 carbon atoms) or substituted or unsubstituted aryl (e.g., of 6 to 10 carbon atoms), and $R_5$ represents substituted or unsubstituted aryl (e.g., of 6 to 10 carbon atoms); and/or (xiii) $R_5$ is 4-methoxyphenyl; and/or (xi) the first compound is an aryloxy compound according to the formula:

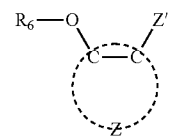

wherein $R_6$ represents a moiety that includes a functional group that can be cleaved from the oxygen atom to which it is attached to form a hydroxyl group, Z represents the atoms necessary to complete an aromatic ring structure, and Z' represents the atoms necessary to complete a conjugated structure with the proviso that Z further includes a moiety capable of hydrogen bonding to the hydroxyl group formed by the cleavage of $R_6$; and/or (xii) —$R_6$ is represented by the structure -L-$R_8$ wherein L, together with the oxygen to which L is attached, represents the atoms necessary to form a cleavable ester, carbonate, or sulfonate linkage, and $R_8$ represents an organic radical; and/or (xiii) $R_6$ represents a substituted or unsubstituted benzoyl group, a substituted or unsubstituted alkoxycarbonyl group, the atoms necessary to complete a tosyl group, or a 4-nitrophenyl carbonyl group; and/or (xiv) $R_6$ represents a substituted or unsubstituted benzoyl group, a substituted or unsubstituted t-butoxycarbonyl group, or the atoms necessary to complete a tosyl group; and/or (xv) Z' includes a carbonyl group, or nitrogen atom that is capable of hydrogen bonding with said hydroxyl group; and/or (xvi) the first compound is convertible to the converted compound by heating; and/or (xvi) the first compound is convertible to the converted compound by exposure to light; and/or (xvii) the method further comprises converting the first compound to the converted compound; and/or (xviii) the method comprises converting the first compound to the converted compound by heating the first compound; and/or (xix) the method comprises converting the first compound to the converted compound by exposing the first compound to light.

The disclosure is further illustrated by the following non-limiting examples:

EXAMPLES

Example 1

9,10-diphenylanthracene 1.6 g of Diphenylanthracene (5.4 mmol) was dissolved in 20 mL methylene chloride and 3.65 g of $H_2O_2$ (110 mmol). $NaHCO_3$ (110 mmol) was added and stirred at ice bath temperature for 20 mins. To the stirring solution, bis(trifluoroacetoxyiodo)benzene dissolved in $CH_2Cl_2$ was added in a drop-wise fashion over 2 hours. During the addition the solution turned pale bluish green. On completion of the addition, the solution was stirred for an additional 30 minutes. The reaction work-up was done with $NaHCO_3$ followed by water work-up and the organics were extracted into methylene chloride and the contents dried by adding $MgSO_4$. The product was purified using column chromatography (silica gel) with ethyl acetate:hexane=9:1. The most polar fraction was the endoperoxide. For recrystallization, the endoperoxide was dissolved in methylene chloride/hexane (1:1) which yielded clear, plate like crystals.

Figure 6:
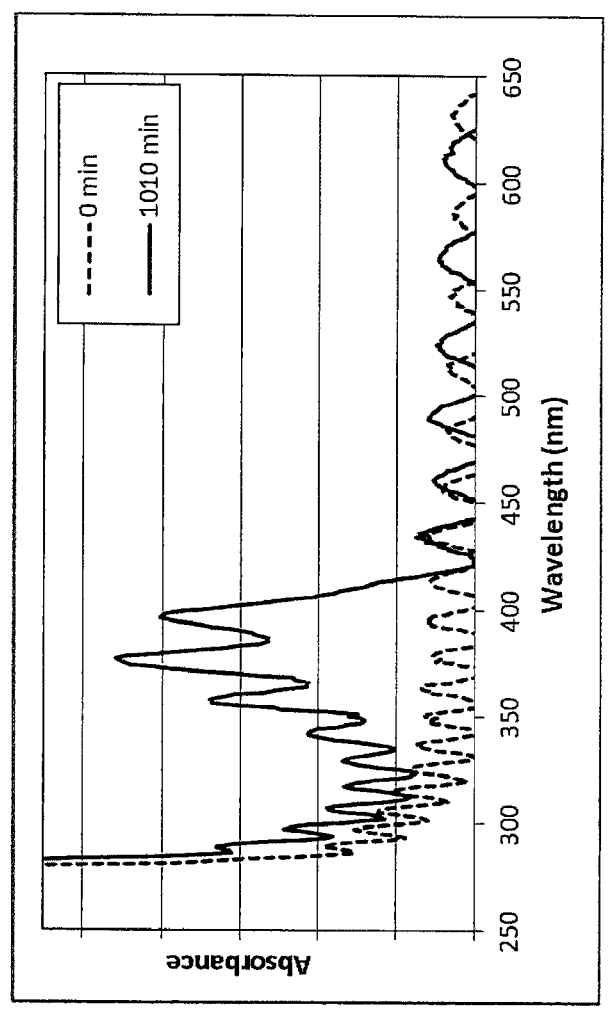
FIG. 6 represents a plot of spectral absorbance of an exemplary dye for a light-blocking layer before and after exposure to heat.

A polymer film comprised of the endoperoxidized blocking dye (4% w/w—9,10-diphenylanthracene endoperoxide) and a polymeric host (high-flow, ductile polycarbonate) was spin-cast onto a glass slide at 2000 RPM for 30 seconds from a 10 wt % w/w solution of polymer in tetrachloroethane (TCE). The film was then exposed to a thermal treatment at 85° C. for a period of 17 hours, during which time the absorption of the parent molecule (9,10-diphenylanthracene) increased approximately 10-fold at λ=405 nm as shown in FIG. 6, demonstrating the capability to selectively increase absorption of a film in situ. The sinusoidal undulations and low net signal seen in the graph are due to the thinness of the polymer films used (hundreds of nanometers).

Example 2

Figure 7:
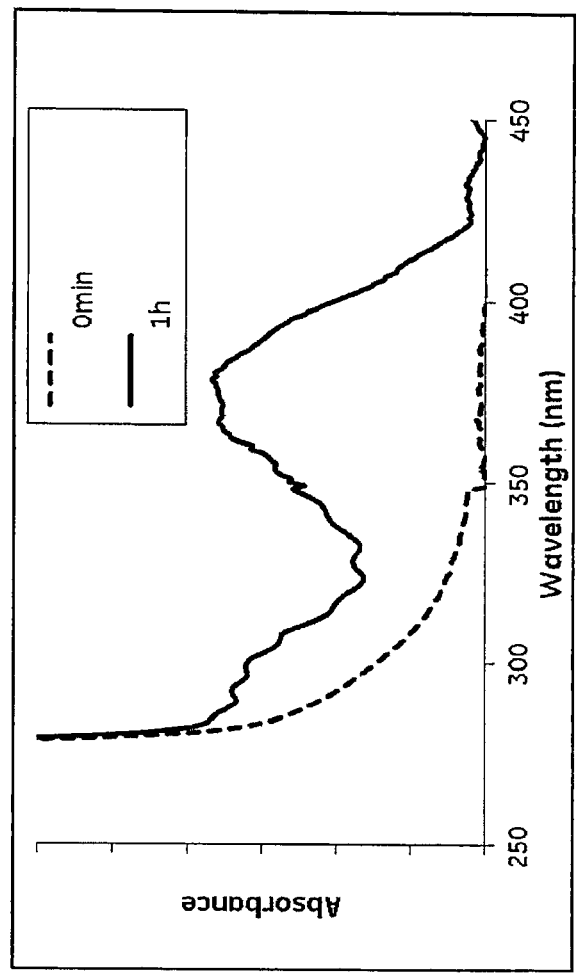
FIG. 7 represents a plot of spectral absorbance of an exemplary dye for a light-blocking layer before and after exposure to heat.

1,3,8-trimethyl-6-phenylpteridine-2,4,7(1H,3H,8H)-trione 1,3,8-Trimethyl-6-phenylpteridine-2,4,7(1H,3H,8H)-trione was prepared as described in *Tetrahedron Lett.*, 27(46), 5637-40. A polymer film comprised of the endoperoxidized blocking dye (4% w/w—1,3,8-trimethyl-6-phenylpteridine-2,4,7(1H,3H,8H)-trione) and a polymeric host (high-flow, ductile polycarbonate) was spin-cast onto a glass slide at 2000 RPM for 30 seconds from a 10% w/w solution in tetrachloroethane (TCE). The film was then exposed to a thermal treatment at 55° C. for a period of 1 hour, during which time the absorption of the parent molecule increased significantly 10-fold in the range of λ=350-400 nm as shown in FIG. 7, demonstrating the capability to selectively increase absorption of a film in situ.

Example 3

2-hydroxy-(5-methoxy)benzophenone

2-Hydroxy-(5-methoxy)benzophenone was synthesized from 1,4-dimethoxy benzene (obtained from Aldrich) according to the following reaction scheme:

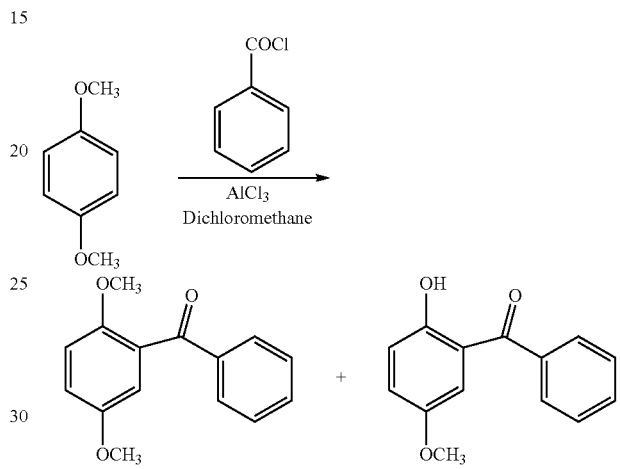

1,4-dimethoxybenzene (5.0 g) was dissolved in 80 ml of dichloromethane. Anhydrous $AlCl_3$ (4.78 g) was added slowly followed by drop-wise addition of benzoyl chloride (3.90 g) to the clear solution. The reaction was stirred at room temperature for 24 hours. The reaction mixture was then dumped onto ice. The organic layer was separated and washed thoroughly with water. The organic layer was then evaporated to get an oily mass. To the oily mass, hexane was added as a solvent and solid was separated out. This solid was then stirred with diluted NaOH. The insoluble part was removed by filtration. To the clear filtrate, diluted hydrochloric acid was added and a pale yellow colored solid separated out. This solid was filtered and washed with water. The weight of the obtained solid was 2.2 g.

Figure 8:
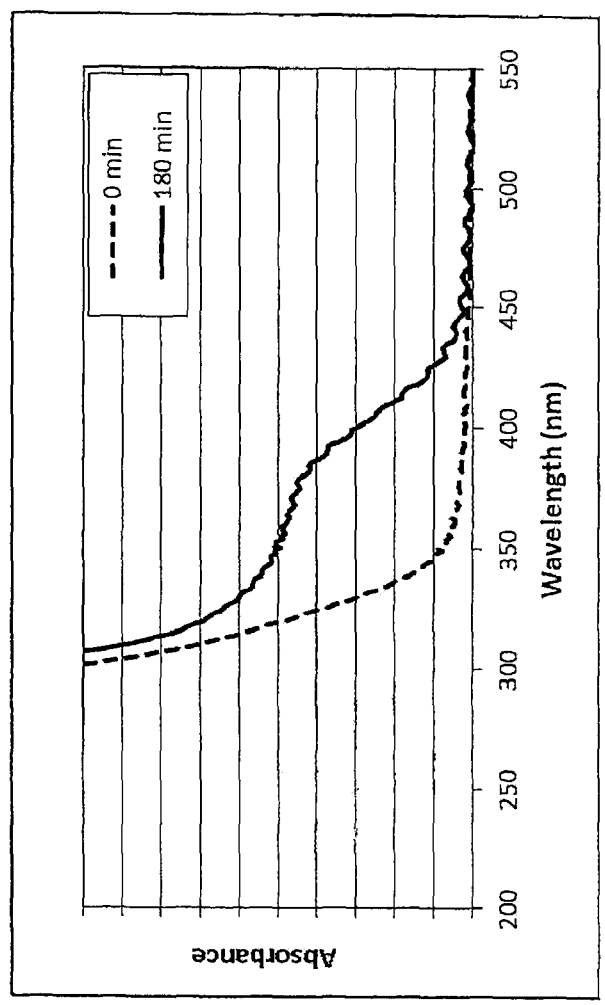
FIG. 8 represents a plot of spectral absorbance of an exemplary dye for a light-blocking layer before and after exposure to light.

The light blocking dye 2-hydroxy-(5-methoxy)benzophenone (1 g, 0.0044 mole) was reacted with benzoyl chloride (0.7 g, 0.005 mole) in pyridine (10 ml) as a solvent. The reaction mixture was heated at 110° C. in an oil-bath for 4 hrs. On completion of the reaction (monitored by thin-layer chromatography), the reaction mixture was quenched with ice. A white-colored solid separated out and was filtered and washed with water followed by hexane to yield 5-methoxy-(2-benzoyloxy)benzophenone. Weight of the crude product was 1.1 g, and 0.6 g of the pure material was obtained on purification. A polymer film comprised of the latent dye (4% w/w in high-flow ductile polycarbonate) was spin-cast on glass at 500 RPM for 30 seconds from a 10% w/w solution of polymer and dye in tetrachloroethylene. The film was then exposed to a fluorescent UV light source emitting in the UV-B region of the spectrum with peak emission at approximately 330 nm (Luzchem photoreactor LZC 4V, ~8 W/cm²) for up to 180 minutes. As shown in FIG. 8, the absorption at 405 nm increased upon UV exposure approximately 12× in thin films over the course of exposure. This response is scalable for higher dye loadings or thicker films and would ensure sufficient coverage of the holographic layers to prevent further degradation of the written holograms.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. An article for recording a hologram, comprising:
a holographic recording medium comprising a transparent polymeric binder and a photoreactive dye dispersed therein; and
a first compound, disposed over a first surface of the holographic recording medium from which surface the hologram is viewed,
wherein said first compound is transparent to light in the wavelength range to which the photoreactive dye is sensitive and which is capable of being converted by exposure to light or heat to a first converted compound that is opaque to light in the wavelength range to which the photoreactive dye is sensitive and transparent to light in a different wavelength range for viewing the hologram, and
wherein said first compound is an endoperoxide having the formula:

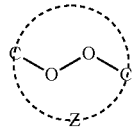

wherein Z represents the atoms necessary to complete an aromatic ring structure, or said first compound is an aryloxy compound according to the formula:

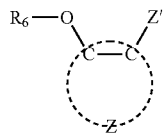

wherein $R_6$ represents a moiety comprising a functional group that can be cleaved from the oxygen atom to which it is attached to form a hydroxyl group, Z represents the atoms necessary to complete an aromatic ring structure, and Z' represents the atoms necessary to complete a conjugated structure with the proviso that Z' includes a moiety capable of hydrogen bonding with said hydroxyl group.

2. The article of claim 1, wherein the holographic recording medium is a holographic film.

3. The article of claim 1, further comprising a second compound disposed over a second surface of the holographic recording medium, wherein the second compound is the same as or different from the first compound and is transparent to light in the wavelength range to which the photoreactive dye is sensitive and is capable of being converted to a second converted compound that is opaque to light in the wavelength range to which the photoreactive dye is sensitive and transparent to light in a different wavelength range for viewing the hologram.

4. The article of claim 1, further comprising a reflecting material over a second surface of the holographic recording medium.

5. The article of claim 4, wherein the reflecting material is opaque in the wavelength range to which the photoreactive dye is sensitive.

6. The article of claim 4, further comprising a light-blocking material over the second surface of the holographic recording medium, wherein the light-blocking material is opaque in the wavelength range to which the photoreactive dye is sensitive.

7. The article of claim 4, wherein the holographic recording medium is a holographic film.

8. The article of claim 1, further comprising a light-blocking material over a second surface, wherein said light-blocking material is opaque in the wavelength range to which the photoreactive dye is sensitive.

9. The article of claim 8, wherein the holographic recording medium is a holographic film.

10. The article of claim 1, wherein said first compound is an endoperoxide having the formula:

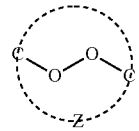

wherein Z represents the atoms necessary to complete an aromatic ring structure.

11. The article of claim 10, wherein said first compound is a pteridine trione having an endoperoxide moiety.

12. The article of claim 11, wherein said first compound has the formula:

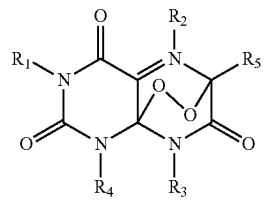

wherein $R_1$, $R_2$, $R_3$, and $R_4$ each independently represents substituted or unsubstituted alkyl or substituted or unsubstituted aryl, and $R_5$ represents substituted or unsubstituted aryl.

13. The article of claim 12, wherein $R_5$ is 4-methoxyphenyl.

14. The article of claim 1, wherein said first compound is an aryloxy compound according to the formula:

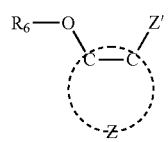

wherein $R_6$ represents a moiety comprising a functional group that can be cleaved from the oxygen atom to which it is attached to form a hydroxyl group, Z represents the atoms necessary to complete an aromatic ring structure, and Z' represents the atoms necessary to complete a conjugated structure with the proviso that Z' includes a moiety capable of hydrogen bonding with said hydroxyl group.

15. The article of claim 14, wherein —$R_6$ is represented by the structure -L-$R_8$ wherein L, together with the oxygen to which L is attached, represents the atoms necessary to form a cleavable ester, carbonate, or sulfonate linkage, and $R_8$ represents an organic radical.

16. The article of claim 14, wherein $R_6$ represents a substituted or unsubstituted benzoyl group, a substituted or unsubstituted alkoxycarbonyl group, the atoms necessary to complete a tosyl group, or a 4-nitrophenyl carbonyl group.

17. The article of claim 14, wherein $R_6$ represents a substituted or unsubstituted benzoyl group, a substituted or unsubstituted t-butoxycarbonyl group, or the atoms necessary to complete a tosyl group.

18. The article of claim 14, wherein Z' includes a carbonyl group or nitrogen atom that is capable of hydrogen bonding with said hydroxyl group.

19. The article of claim 1, wherein said first compound is capable of being converted to the converted compound by heating.

20. The article of claim 1, wherein said first compound is capable of being converted to the converted compound by exposure to light.

21. A method of generating a volume hologram, comprising:
exposing a holographic recording medium to mutually coherent interfering light beams to generate an interference fringe pattern, said holographic recording medium comprising a transparent polymeric binder and a photoreactive dye dispersed therein, said holographic recording medium being disposed in an article, said article further comprising a first compound disposed over a first surface of the holographic recording medium from which surface the hologram is viewed, wherein said first compound is transparent to light in the wavelength range to which the photoreactive dye is sensitive;
exposing the first compound to light or heat to convert the first compound to a first converted compound that is opaque to light in the wavelength range to which the photoreactive dye is sensitive and transparent to light in a different wavelength range for viewing the hologram.

22. The method of claim 21, wherein the holographic recording medium is a holographic film.

23. The method of claim 21, wherein said article further comprises a second compound disposed over a second surface of the holographic recording medium, wherein the second compound is the same as or different from the first compound and is transparent to light in the wavelength range to which the photoreactive dye is sensitive and is converted, by exposure to light or heat, to a second converted compound that is opaque to light in the wavelength range to which the photoreactive dye is sensitive and transparent to light in a different wavelength range for viewing the hologram.

24. The method of claim 21, wherein said article further comprises a reflecting material over a second surface of the holographic recording medium.

25. The method of claim 24, wherein the reflecting material is opaque in the wavelength range to which the photoreactive dye is sensitive.

26. The method of claim 24, wherein the article further comprises a light-blocking material disposed over the second surface, wherein the light-blocking material is opaque in the wavelength range to which the photoreactive dye is sensitive.

27. The method of claim 24, wherein the holographic recording medium is a holographic film.

28. The method of claim 21, wherein said article further comprises a light-blocking material over a second surface of the holographic recording medium, wherein said light-blocking material is opaque in the wavelength range to which the photoreactive dye is sensitive.

29. The method of claim 28, wherein the holographic recording medium is a holographic film.

30. The method of claim 21, wherein said first compound is an endoperoxide having the formula:

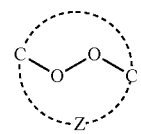

wherein Z represents the atoms necessary to complete an aromatic ring structure.

31. The method of claim 30, wherein said first compound is a pteridine trione having an endoperoxide moiety.

32. The method of claim 31, wherein said first compound has the formula:

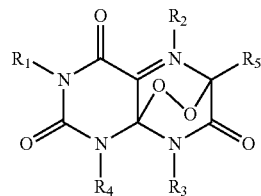

wherein $R_1$, $R_2$, $R_3$, and $R_4$ each independently represents substituted or unsubstituted alkyl or substituted or unsubstituted aryl, and $R_5$ represents substituted or unsubstituted aryl.

33. The method of claim 32, wherein $R_5$ is 4-methoxyphenyl.

34. The method of claim 21, wherein said first compound is an aryloxy compound according to the formula:

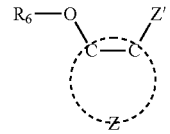

wherein $R_6$ represents a moiety comprising a functional group that can be cleaved from the oxygen atom to which it is attached to form a hydroxyl group, Z represents the atoms necessary to complete an aromatic ring structure, and Z' represents the atoms necessary to complete a conjugated structure with the proviso that Z' includes a moiety capable of hydrogen bonding with said hydroxyl group.

35. The method of claim 34, wherein —$R_6$ is represented by the structure -L-$R_8$ wherein L, together with the oxygen to which L is attached, represents the atoms necessary to form a cleavable ester, carbonate, or sulfonate linkage, and $R_8$ represents an organic radical.

36. The method of claim 34, wherein $R_6$ represents a substituted or unsubstituted benzoyl group, a substituted or unsubstituted alkoxycarbonyl group, the atoms necessary to complete a tosyl group, or a 4-nitrophenyl carbonyl group.

37. The method of claim 34, wherein $R_6$ represents a substituted or unsubstituted benzoyl group, a substituted or unsubstituted t-butoxycarbonyl group, or the atoms necessary to complete a tosyl group.

38. The method of claim 34, wherein Z' includes a carbonyl group, or nitrogen atom that is capable of hydrogen bonding with said hydroxyl group.

39. The method of claim 21, wherein the first compound is converted to the first converted compound by heating.

40. The method of claim 21, wherein the first compound is converted to the first converted compound by exposing said first compound to light.

* * * * *